US007085647B1

(12) United States Patent
Prucka et al.

(10) Patent No.: US 7,085,647 B1
(45) Date of Patent: Aug. 1, 2006

(54) AIRFLOW-BASED OUTPUT TORQUE ESTIMATION FOR MULTI-DISPLACEMENT ENGINE

(75) Inventors: Michael J Prucka, Grass Lake, MI (US); Michael A Bonne, Leonard, MI (US); Gregory L Ohl, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/085,423

(22) Filed: Mar. 21, 2005

(51) Int. Cl.
*G06F 19/00* (2006.01)

(52) U.S. Cl. .................................................... 701/114

(58) Field of Classification Search ................ 701/114, 701/110, 115, 102, 107; 123/350, 319, 352, 123/399, 361, 480
See application file for complete search history.

(56) References Cited

U.S. PATENT DOCUMENTS

| | | | | |
|---|---|---|---|---|
| 5,111,788 | A * | 5/1992 | Washino | 123/339.11 |
| 5,408,974 | A | 4/1995 | Lipinski et al. | |
| 5,568,795 | A | 10/1996 | Robichaux et al. | |
| 5,806,012 | A | 9/1998 | Maki et al. | |
| 5,839,409 | A | 11/1998 | Denz et al. | |
| 5,970,943 | A | 10/1999 | Robichaux et al. | |
| 6,311,670 | B1 | 11/2001 | Constancis | |
| 6,360,713 | B1 | 3/2002 | Kolmanovsky et al. | |
| 6,615,804 | B1 | 9/2003 | Matthews et al. | |
| 6,655,353 | B1 | 12/2003 | Rayl | |
| 6,687,602 | B1 * | 2/2004 | Ament | 701/110 |
| 6,736,108 | B1 | 5/2004 | Rayl et al. | |
| 6,752,121 | B1 | 6/2004 | Rayl et al. | |
| 6,782,865 | B1 | 8/2004 | Rayl et al. | |
| 6,843,752 | B1 | 1/2005 | Bolander | |
| 7,000,589 | B1 * | 2/2006 | Matthews et al. | 123/350 |
| 7,013,866 | B1 * | 3/2006 | Prucka et al. | 701/110 |
| 2002/0157640 | A1 | 10/2002 | Matthews et al. | |
| 2002/0162540 | A1 | 11/2002 | Matthews et al. | |
| 2004/0244744 | A1 | 12/2004 | Falkowski et al. | |
| 2004/0244751 | A1 | 12/2004 | Falkowski et al. | |

OTHER PUBLICATIONS

Bates, B.; Dosdall, J. M.; and Smith, D. H.; "Variable Displacement by Engine Valve Control," SAE Paper No. 780145 (New York, NY; 1978).

(Continued)

*Primary Examiner*—Hieu T. Vo
(74) *Attorney, Agent, or Firm*—Ralph E. Smith

(57) ABSTRACT

A method for estimating an output torque generated by a multi-displacement engine operating in a partial-displacement mode includes multiplying a measure representing a mass air flow through the engine's intake manifold by a engine-speed-based mass-air-flow-to-torque conversion factor, and thereafter summing the product with a torque offset value likewise based on engine speed data, to obtain a base indicated potential output torque. The base indicated potential output torque is then multiplied with a torque-based efficiency conversion factor representing at least one of a partial-displacement mode spark efficiency, fuel-air-ratio efficiency, and exhaust gas recirculation efficiency, and the resulting product is summed with a torque-based frictional loss measure to obtain the desired estimated engine output torque. The estimated engine output torque is particularly useful in determining whether a transition from the partial-displacement engine operating mode to a full-displacement engine operating mode is desired.

14 Claims, 1 Drawing Sheet

OTHER PUBLICATIONS

Mueller, Robert S.; and Uitvlugt, Martin W.; "Valve Selector Hardware," SAE Publication No. 780146 (New York, NY; 1978).

Fukui, Toyoaki; Nakagami, Tatsuro; Endo, Hiroyasu; Katsumoto, Takehiko; and Danno, Yoshiaki; "Mitsubishi Orion-MD—A New Variable Displacement Engine," SAE Paper No. 831007 (New York, NY; 1983).

Hatano, Kiyoshi; Iida, Kazumasa; Higashi, Hirohumi; and Murata, Shinichi; "Development of a New Multi-Mode Variable Valve Timing Engine," SAE Paper No. 930878 (New York, NY; 1993).

McElwee, Mark; and Wakeman, Russell; "A Mechanical Valve System with Variable Lift, Duration, and Phase Using a Moving Pivot," SAE Paper No. 970334 (New York, NY; 1997).

Yacoub, Yasser; and Atkinson, Chris; "Modularity in Spark Ignition Engines: A Review of its Benefits, Implementation and Limitations," SAE Publication No. 982688 (New York, NY; 1998).

Zheng, Quan; "Characterization of the Dynamic Response of a Cylinder Deactivation Valvetrain System," SAE Publication No. 2001-01-0669 (New York, NY; 2001).

Leone, T.G.; and Pozar, M.; "Fuel Economy Benefit of Cylinder Deactivation—Sensitivity to Vehicle Application and Operating Constraints," SAE Paper No. 2001-01-3591 (New York, NY; 2001).

Patton, Kenneth J.; Sullivan, Aaron M.; Rask, Rodney B.; and Theobald, Mark A.; "Aggregating Technologies for Reduced Fuel Consumption: A Review of the Technical Content in the 2002 National Research Council Report on CAFÉ," SAE Paper No. 2002-01-0628 (New York, NY; 2002).

Falkowski, Alan G.; McElwee, Mark R.; and Bonne, Michael A.; "Design and Development of the Daimlerchrysler 5.7l Hemi Engine Multi -Displacement Cylinder Deactivation System," SAE Publication No. 2004-01-2106 (New York, NY, May 7, 2004).

2004 Global Powertrain Congress program, Sep. 28-30, 2004, Ford Conference & Event Center, Dearborn, Michigan, USA (9 pages).

Albertson, William, et al [William Albertson, Thomas Boland, Jia-shium Chen, James Hicks, Gregory P. Matthews, Micke McDonald, Sheldon Plaxton, Allen Rayl, Frederick Rozario], "Displacement on Demand for Improved Fuel Economy Without Compromising Performance in GM's High Value Engines," Powertrain International—2004 Global Powertrain Conference, Saline, Michigan, Sep. 29, 2004.

* cited by examiner

AIRFLOW-BASED OUTPUT TORQUE ESTIMATION FOR MULTI-DISPLACEMENT ENGINE

FIELD OF THE INVENTION

The invention relates generally to methods for controlling the operation of an multiple-displacement internal combustion engine, for example, used to provide motive power for a motor vehicle.

BACKGROUND OF THE INVENTION

The prior art teaches equipping vehicles with "variable displacement," "displacement on demand," or "multiple displacement" internal combustion engines in which one or more cylinders may be selectively "deactivated," for example, to improve vehicle fuel economy when operating under relatively low-load conditions. Typically, the cylinders are deactivated through use of deactivatable valve train components, such as the deactivating valve lifters as disclosed in U.S. patent publication no. US 2004/0244751 A1, whereby the intake and exhaust valves of each deactivated cylinder remain in their closed positions notwithstanding continued rotation of their driving cams. Combustion gases are thus trapped within each deactivated cylinder, whereupon the deactivated cylinders operate as "air springs" to reduce engine pumping losses.

When vehicle operating conditions are thereafter deemed to require an engine output torque greater than that achievable without the contribution of the deactivated cylinders, as through a heightened torque request from the vehicle operator based upon a detected intake manifold air pressure representing a current engine load, the deactivatable valve train components are returned to their nominal activated state to thereby "reactivate" the deactivated cylinders. More specifically, under one prior art approach, a torque request or torque demand signal, as determined, for example, from current accelerator pedal position and current engine speed, is compared to a mapped value for available engine torque at that engine speed. A value for a torque "reserve" representing an output torque "cushion" during a subsequent transition to a full-cylinder-activation mode with no more than a negligible torque disturbance (generally imperceptible to the vehicle operator) is also calculated or provided. When the torque request exceeds the mapped threshold value less the reserve threshold, the engine control module initiates a "slow" transition out of the cylinder-deactivation engine operating mode. These "slow" transitions, intended to feature only those transition torque disturbances that are generally imperceptible to the vehicle operator, are to be distinguished from "fast" transitions that are typically triggered in response, for example, a torque request that well exceeds the available engine torque, under which conditions a noticeable torque disturbance is perhaps even desirable as feedback to the vehicle operator.

Unfortunately, because the prior art "trigger" for such "slow" transitions back to a full-displacement engine operating mode is based upon detected manifold air pressure, it will be appreciated that the prior art approach may specify continued engine operation in a partial-displacement mode that might otherwise generate unacceptable levels of vehicle noise, vibration, and harshness (NVH) determinations. Further, such prior art approaches necessarily require corrections to the detected manifold air pressure, for example, for ambient barometric pressure and temperature, thereby increasing the complexity of the calculations from which a maximum engine output torque in partial-displacement mode is derived, while further requiring such additional engine hardware as a barometric pressure sensor.

BRIEF SUMMARY OF THE INVENTION

In accordance with an aspect of the invention, a method for estimating an output torque generated by a multi-displacement internal combustion engine operating in a partial-displacement mode, for example, for use in controlling a "slow" reactivation of a given deactivated engine cylinder, includes providing a first measure representing a mass air flow through the engine's intake manifold based, for example, on detected instantaneous values for engine speed and manifold air pressure. Alternatively, the first measure is representative of a maximum mass air flow that can be achieved during partial-displacement engine operation, for example, based on engine speed, manifold air pressure, and at least one of a detected or inferred value for the barometric pressure, an inlet air temperature, an engine coolant temperature, and an exhaust oxygen content, as represented by an output of an exhaust oxygen sensor.

The method further includes determining a mass-air-flow-to-torque conversion factor and a mass-air-flow-to-torque offset based on the engine speed data. While the invention contemplates determining the conversion factor and the offset in any suitable manner, in an exemplary computer-executable process in accordance with the invention, respective calibratable values for the conversion factor and the offset are retrieved from a pair of lookup tables based on an averaged value for engine speed. In accordance with another aspect of the invention, the first measure is determined based on a calculation of a maximum mass air flow through the intake manifold in a full-displacement engine operating mode, multiplied by a partial-displacement correction factor that preferably reflects both the absence of the deactivated cylinders and the any effects of cylinder deactivation on airflow through the intake manifold (which may, for example, be optimized for full-displacement engine operation rather than partial-displacement engine operation).

The method further includes multiplying the first measure representing an instantaneous or maximum mass air flow by the conversion factor to obtain a second measure representing an instantaneous or maximum pre-offset base indicated torque, respectively; and summing the second measure with the torque offset to obtain a third measure representing an instantaneous or maximum base indicated potential torque. The instantaneous or maximum base indicated potential torque measure is thereafter multiplied with a torque-based efficiency conversion factor to thereby obtain a third measure representing an instantaneous or maximum efficiency-corrected indicated potential torque measure. It will be appreciated that the invention contemplates using a torque-based efficiency measure that preferably represents the product of a variety of efficiency measures impacting the instantaneous and maximum engine output torque when the engine operates in the partial-displacement mode, for example, a partial-displacement spark efficiency measure (e.g., based on the delta spark from MBT), a fuel-air-ratio efficiency measure (e.g., based on an average fuel-air-ratio where LBT is considered as 1.0), and an exhaust gas recirculation efficiency measure (e.g., based on an EGR fraction).

Preferably, and in accordance with another aspect of the invention, the method includes summing the third measure with a torque-based frictional loss measure to thereby obtain the desired estimate of instantaneous or maximum engine output torque that is generated at the engine's flywheel.

While the invention contemplates determining the frictional loss measure in any suitable manner, in a preferred embodiment, the frictional loss measure at least includes torque-based values representing temperature- and load-based mechanical friction losses, pumping losses, and short-term losses from the "negative work" associated with the compression of the intake charge trapped in the deactivated cylinders (which short-term losses preferably "ramp down" to a zero value after several engine cycles).

From the foregoing, it will be appreciated that the invention provides an air-flow-based measure representing one or both of an instantaneous engine output torque and a maximum engine output torque during engine operation in a partial-displacement mode, each of which is advantageously utilized in making a torque-based determination whether a transition to full-displacement engine operation is desirable. Further, output torque determinations in accordance with the invention inherently corrects for the NVH effects of lower engine speed operation through use of the speed-based conversion factor and torque offset, thereby providing desired transitions to full-displacement engine operation before reaching the NVH levels tolerated by prior art manifold-pressure-based transition algorithms.

Other objects, features, and advantages of the present invention will be readily appreciated upon a review of the subsequent description of the preferred embodiment and the appended claims, taken in conjunction with the accompanying Drawings.

DETAILED DESCRIPTION OF THE INVENTION

Figure 1:
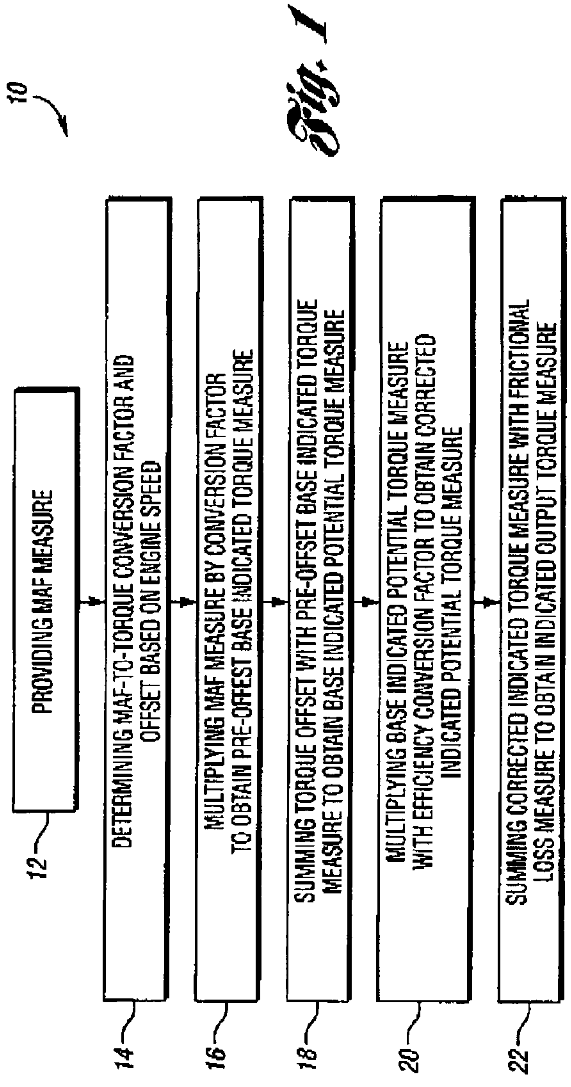
FIG. 1 is a flow chart illustrating the main steps of a method in accordance with an aspect of the invention for estimating an output torque generated by a multi-displacement internal combustion engine operating in a partial-displacement mode.

A method 10 for estimating an output torque generated by a multi-displacement internal combustion engine operating in a partial-displacement mode that is, for example, particularly well-suited for use in controlling a "slow" reactivation of a given deactivated engine cylinder, is generally illustrated in FIG. 1. While the invention contemplates any suitable hydraulic and/or electro-mechanical systems for deactivating the given cylinder, including deactivatable valve train components, an exemplary method is used in controlling an eight-cylinder engine in which four cylinders are selectively deactivated through use of deactivatable valve lifters as disclosed in U.S. patent publication no. US 2004/0244751 A1, the teachings of which are hereby incorporated by reference.

As seen in FIG. 1, the method 10 generally includes providing, at block 12, a first measure representing a mass air flow (MAF) through the engine's intake manifold based, for example, on detected instantaneous values for engine speed and manifold air pressure. By way of example only, in an exemplary embodiment, the first measure represents either a value representing an instantaneous engine output, or a maximum mass air flow that can be achieved during partial-displacement engine operation, the latter conveniently being calculated in an exemplary embodiment as a function of an available determined value for full-displacement maximum mass air flow, as by multiplying the full-displacement maximum mass air flow by a partial-displacement correction factor that preferably reflects both the absence of the deactivated cylinders and the effects of cylinder deactivation on airflow through the intake manifold (which may, for example, be optimized for full-displacement engine operation rather than partial-displacement engine operation). Alternatively, it will be appreciated that the invention is equally suitable for use with a mass air flow measure that is itself derived from the output of a mass air flow sensor disposed in the engine's intake manifold.

It will also be appreciated that the invention contemplates determining the first measure provided at block 12, representing an instantaneous or maximum mass air flow through the engine's intake manifold, in any suitable manner. In the exemplary embodiment, for example, the first measure is determined using a speed-density model, based on engine speed, manifold air pressure, and at least one of a detected or inferred values for barometric pressure, inlet air temperature, engine coolant temperature, and exhaust oxygen content (the latter being derived, for example, from an output of an exhaust oxygen sensor).

Referring again to FIG. 1, at block 14, the method 10 further includes determining a mass-air-flow-to-torque conversion factor and a mass-air-flow-to-torque offset based on the engine speed data. While the invention contemplates determining the conversion factor and the offset in any suitable manner, in an exemplary computer-executable process in accordance with the invention, respective calibratable values for the conversion factor and the offset are retrieved from a pair of lookup tables based on an averaged value for engine speed.

As seen at block 16 of FIG. 1, the method 10 further includes multiplying the first measure representing an instantaneous or maximum mass air flow by the retrieved value for the engine-speed-based conversion factor to obtain a second measure representing an instantaneous or maximum pre-offset base indicated torque, respectively; and, at block 18, summing the second measure with the retrieved value for the engine-speed-based torque offset to obtain a third measure representing an instantaneous or maximum base indicated potential torque. At block 20, the instantaneous or maximum base indicated potential torque measure is thereafter multiplied with a torque-based efficiency conversion factor that itself represents the product of a variety of efficiency measures impacting the instantaneous and maximum engine output torque when the engine operates in the partial-displacement mode, for example, a partial-displacement spark efficiency measure (e.g., based on the delta spark from Mean Best Torque, or MBT), a fuel-air-ratio efficiency measure (e.g., based on an average fuel-air-ratio where Lean Best Torque, or LBT, is considered as 1.0), and an exhaust gas recirculation efficiency measure (e.g., based on an EGR fraction, where the absence of exhaust gas recirculation is represented by a EGR efficiency measure equal to 1.0). The product of block 20 is a third measure representing an instantaneous or maximum efficiency-corrected indicated potential torque measure.

And, at block 22 of FIG. 1, the method 10 includes summing the third measure with a torque-based frictional loss measure to thereby obtain the desired estimate of instantaneous or maximum engine output torque that is generated at the engine's flywheel. In a preferred embodiment, the frictional loss measure at least includes torque-based values representing temperature- and load-based mechanical friction losses, pumping losses, and short-term losses from the "negative work" associated with the compression of the intake charge trapped in the deactivated cylinders (which short-term losses preferably "ramp down" to a zero value after several engine cycles). Thus, in the preferred embodiment, the frictional loss measure advantageously reflects a temperature portion of friction based, for example, on engine speed and a detected or derived engine coolant temperature; a load portion of friction based, for example, on engine speed and detected manifold air pressure; a high-altitude throttling loss determined, for example, using barometric offset based on a change in the size of the pressure-volume diagram; and a start-up loss determined, for example, using a three-dimensional lookup table based on accumulated port flow and engine coolant temperature. It is noted that, as in the preferred embodiment, at least some of the frictional losses represented by the frictional loss measure are characterized as a function of engine speed.

Figure 2:
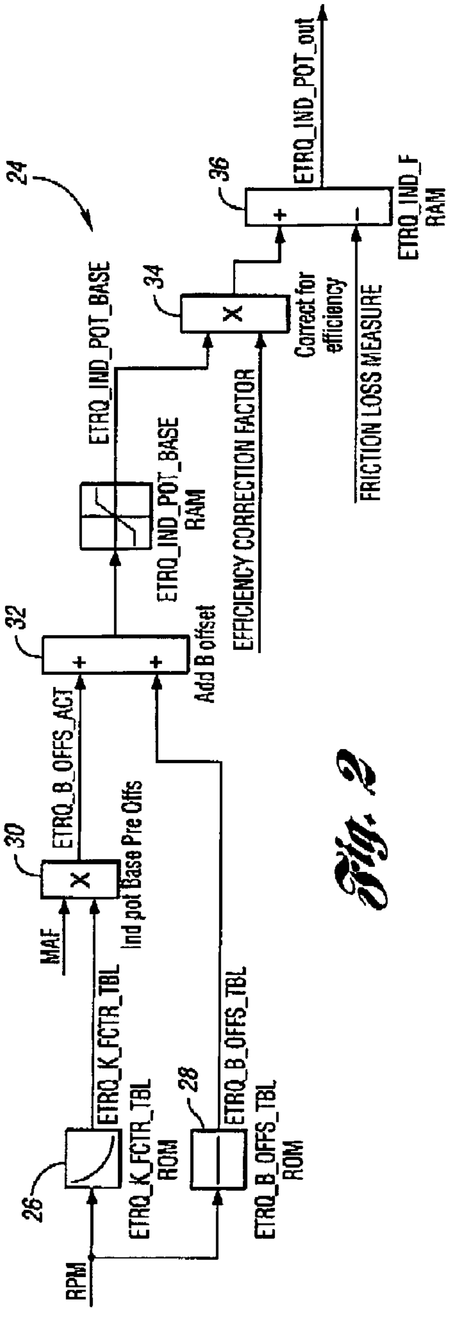
FIG. 2 shows an exemplary computer-executable process for estimating an output torque generated by a multi-displacement internal combustion engine operating in a partial-displacement mode, in accordance with the invention.

Referring to FIG. 2, in an exemplary computer-executable process 24 in accordance with the invention, engine speed data (RPM) is used as an input to each of two lookup tables 24,26 to thereby retrieve stored engine-speed-based values for both a mass-air-flow-to-torque conversion factor and a torque offset. A provided value for mass air flow (MAF) is supplied along with the mass-air-flow-to-torque conversion factor to a multiplier 30, and the resulting product ETRQ_B_OFFS_ACT is supplied with the torque offset to a summation block 32. The resulting filtered sum ETRQ_IND_POT_BASE, representing the airflow-based base indicated potential torque, is supplied with an efficiency correction factor to a multiplier 34 to thereby correct the base indicated potential torque for partial-displacement efficiency reductions in such factors as spark, fuel-air ratio, and exhaust gas recirculation. The resulting product, representing an efficiency-corrected indicated potential torque, is summed at summation block 36 with a frictional loss measure that is itself preferably at least partially characterized as a function of engine speed, as described in the preceding paragraph. The output ETRQ_IND_POT_out of summation block 36 is an estimate of indicated output torque at the flywheel, for use in determining whether a transition to a full-displacement engine operating mode is desired.

While the above description constitutes the preferred embodiment, it will be appreciated that the invention is susceptible to modification, variation and change without departing from the proper scope and fair meaning of the subjoined claims.

What is claimed is:

1. A method for estimating an output torque generated by a multi-displacement internal combustion engine operating in a partial-displacement mode, the engine including an intake manifold and an engine speed sensor generating engine speed data, the method comprising:

providing a first measure representing a mass air flow through the intake manifold;

determining a mass-air-flow-to-torque conversion factor and a mass-air-flow-to-torque offset based on the engine speed data;

multiplying the first measure by the conversion factor to obtain a second measure representing a pre-offset base indicated torque;

summing the second measure with the torque offset to obtain a third measure representing a base indicated potential torque; and multiplying the base indicated potential torque measure with a torque-based efficiency conversion factor representing at least one of a spark efficiency measure, a fuel-air-ratio efficiency measure, and an exhaust gas recirculation efficiency measure, to obtain a third measure representing an efficiency-corrected indicated potential torque measure.

2. The method of claim 1, wherein providing includes determining the first measure based on a detected manifold air pressure and the engine speed data.

3. The method of claim 1, wherein the first measure further represents a maximum mass air flow through the intake manifold, and wherein determining the first measure is further based on at least one of a barometric pressure, an inlet air temperature, an engine coolant temperature, and an exhaust gas oxygen content.

4. The method of claim 3, wherein the first measure represents the maximum mass air flow through the intake manifold in a full-displacement engine operating mode, and wherein the first measure is further determined by multiplying the maximum mass air flow by a partial-displacement correction factor.

5. The method of claim 1, further including calculating an average engine speed based on the engine speed data, and wherein determining the mass-air-flow-to-torque conversion factor is based on the average engine speed, and determining the torque offset is based on the average engine speed.

6. The method of claim 1, wherein determining the mass-air-flow-to-torque conversion factor includes retrieving a first value from a first lookup table using the engine speed data.

7. The method of claim 1, wherein determining the torque offset includes retrieving a second value from a second lookup table using the engine speed data.

8. The method of claim 1, further including summing the third measure with a torque-based frictional loss measure.

9. A method for estimating an output torque generated by a multi-displacement internal combustion engine operating in a partial-displacement mode, the engine including an intake manifold and an engine speed sensor generating engine speed data, the method comprising:

determining a first measure representing a mass air flow through the intake manifold based on a detected manifold air pressure and the engine speed data providing;

determining a mass-air-flow-to-torque conversion factor and a mass-air-flow-to-torque offset based on the engine speed data;

multiplying the first measure by the conversion factor to obtain a second measure representing a pre-offset base indicated torque;

summing the second measure with the torque offset to obtain a third measure representing a base indicated potential torque;

multiplying the base indicated potential torque measure with a torque-based efficiency conversion factor representing at least one of a spark efficiency measure, a fuel-air-ratio efficiency measure, and an exhaust gas recirculation efficiency measure, to obtain a third measure representing an efficiency-corrected indicated potential torque measure; and summing the third measure with a torque-based frictional loss measure to obtain the estimated output torque.

10. The method of claim 9, wherein the first measure represents a maximum mass air flow through the intake manifold, and wherein determining the first measure is further based on at least one of a barometric pressure, an inlet air temperature, an engine coolant temperature, and an exhaust gas oxygen content.

11. The method of claim 10, wherein the first measure represents the maximum mass air flow through the intake manifold in a full-displacement engine operating mode, and wherein the first measure is further determined by multiplying the maximum mass air flow by a partial-displacement correction factor.

12. The method of claim 9, further including calculating an average engine speed based on the engine speed data, and wherein determining the mass-air-flow-to-torque conversion factor is based on the average engine speed, and determining the torque offset is based on the average engine speed.

13. The method of claim 9, wherein determining the mass-air-flow-to-torque conversion factor includes retrieving a first value from a first lookup table using the engine speed data.

14. The method of claim 9, wherein determining the torque offset includes retrieving a second value from a second lookup table using the engine speed data.

* * * * *